United States Patent [19]

Haller, Jr. et al.

[11] 3,827,537
[45] Aug. 6, 1974

[54] HYDRAULIC SHOCK AND SWAY SUPPRESSOR

[75] Inventors: Henry E. Haller, Jr.; Henry F. Huettner, both of Pittsburgh; Elliott E. Martin, Jr., Valencia, all of Pa.

[73] Assignee: National Valve and Manufacturing Company, Pittsburgh, Pa.

[22] Filed: July 7, 1972

[21] Appl. No.: 269,769

[52] U.S. Cl................. 188/314, 188/280, 188/313
[51] Int. Cl............................................. F16f 9/34
[58] Field of Search .......... 188/313, 314, 318, 280, 188/297; 60/DIG. 10; 92/128

[56] References Cited
UNITED STATES PATENTS

| 2,754,937 | 7/1956 | Buivid................. | 188/313 |
|---|---|---|---|
| 2,838,140 | 6/1958 | Rasmusson et al. ................. | 188/313 |
| 3,029,904 | 4/1962 | Goldring............................ | 188/313 |
| 3,106,992 | 10/1963 | Sherburne..................... | 188/314 X |
| 3,228,348 | 1/1966 | Wilson............................. | 92/128 X |
| 3,572,363 | 3/1971 | Roach............................ | 188/280 X |
| 3,581,626 | 6/1971 | Matthews.......................... | 91/187 X |
| 3,702,646 | 11/1972 | Sherburne......................... | 188/280 |

Primary Examiner—George E. A. Halvosa
Attorney, Agent, or Firm—Webb, Burden, Robinson & Webb

[57] ABSTRACT

An hydraulic shock and sway suppressor, which will absorb normal thermal movement of a piping system but will resist vibration and shock in the system or other equipment includes a cylindrical reservoir in axial alignment with a piston-cylinder assembly of the suppressor and a manifold on the piston-cylinder assembly which provides fluid communication between the reservoir and a valve assembly and between the valve assembly and both sides of the piston in the piston-cylinder assembly. Relief valve means may be disposed between the manifold and the valve assembly.

8 Claims, 11 Drawing Figures

HYDRAULIC SHOCK AND SWAY SUPPRESSOR

This invention relates to an hydraulic shock and sway suppressor for preventing damage to piping and other equipment which is subject to thrust or shock conditions.

Hydraulic shock and sway suppressors are characterized by their ability to absorb a preestablished maximum thermal movement of the piping or equipment with which they are employed but to resist vibration or shock which exceeds that preestablished maximum. The permissible movement is preset in accordance with the construction and thermal movement of the piping or equipment.

In general, prior hydraulic suppressors comprise three basic elements: a piston-cylinder assembly for attachment between a stationary mounting and the piping or equipment; a reservoir for hydraulic fluid; and a valve assembly in communication with the piston-cylinder assembly for regulating the hydraulic fluid flow to and from the reservoir and into and out of the piston-cylinder assembly. Two types of suppressors are shown and described in U.S. Pat. Nos. 3,106,992 and 3,469,833.

In operation, the piston rod of the piston-cylinder assembly will extend or retract within the preestablished thermal movement limits. When shock, vibration or sway tends to increase the rate of displacement of the piston rod beyond the preestablished limits, the valve assembly functions to close fluid flow and the suppressor becomes substantially rigid transferring the forces to the stationary mounting.

We have improved upon present suppressors by providing a streamlined unit which is easily fabricated and has extended service life. Our invention resides in the provision of a shock and sway suppressor unit having a cylindrical reservoir in axial alignment with the longitudinal axis of the piston-cylinder assembly and having a manifold disposed between the piston-cylinder assembly and the valve assembly through which hydraulic fluid is communicated between the reservoir and the valve assembly and between the piston-cylinder assembly and the valve assembly. In a modification, we also incorporate relief valve means between the valve assembly and the manifold for protecting the piston-cylinder assembly and the valve assembly against extreme pressure due to shock.

Several important advantages are obtained in our hydraulic shock and sway suppressor. First, since the reservoir and piston-cylinder assembly are aligned and the manifold and valve assembly are integrally mounted therewith, the unit is highly compact and has no elements which extend from the unit which would result in excessive vibration of the unit itself under vibration and shock forces experienced by piping and other equipment to which the unit is attached. Second, since the fluid connection between the reservoir and the piston-cylinder assembly is through a manifold and valve assembly without exposed tubing, possible damage to the fluid connections and leakage is virtually eliminated. Other features and advantages of our invention will become apparent from the description which follows, when taken with the accompanying drawings in which:

Figure 1:
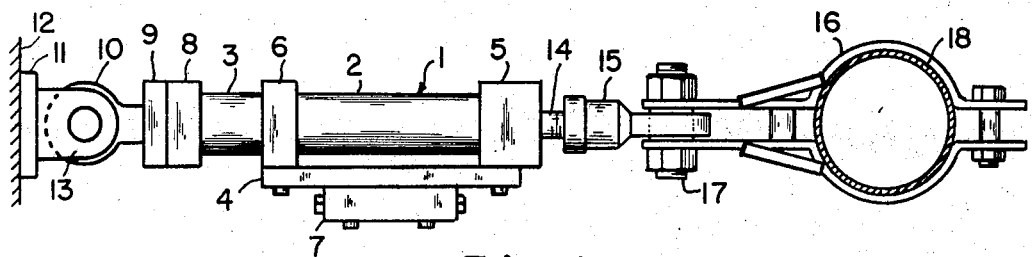
FIG. 1 is a diagrammatic elevation view of a shock and sway suppressor in accordance with our invention positioned between a stationary support and piping.
Figure 2:
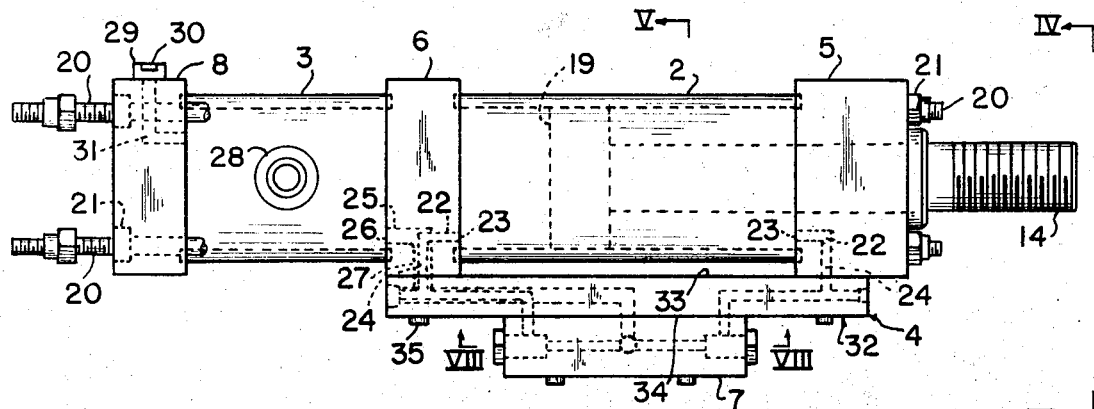
FIG. 2 is an elevation view of the suppressor unit according to our invention.
Figure 3:
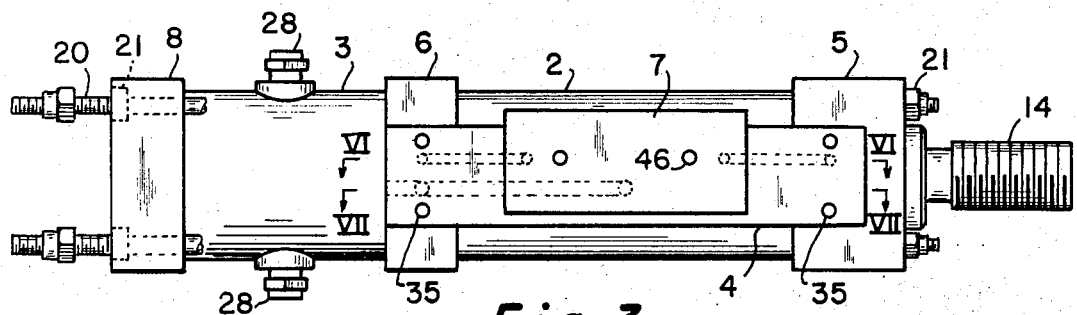
FIG. 3 is a bottom view of the suppressor unit of FIG. 2.
Figures 4, 5:
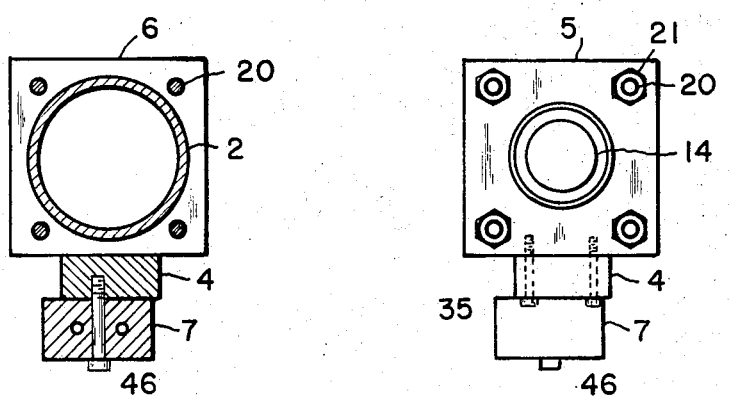
FIG. 4 is a view along lines IV—IV of FIG. 2.
FIG. 5 is a sectional view along lines V—V of FIG. 2.

Referring to FIG. 1, an hydraulic shock and sway suppressor unit 1 according to the invention comprises a piston-cylinder assembly 2 and a cylindrical reservoir 3 in axial alignment with the assembly 2. A manifold 4 extends from flange 5 on one end of the unit to flange 6 which forms one end of the reservoir and an end of the piston-cylinder assembly 2. The faces of the flanges are preferably square. Valve assembly 7 is secured to manifold 4. The other end of the reservoir has a flange 8 which is suitably connected to a mating flange 9 on a link 10. A bracket 11 which may be secured to a stationary support 12 includes a member 13 which is pivotally connected to link 10.

A piston rod 14 extends from the other end of the suppressor unit. A piston rod end 15 is threadably secured to rod 14 and pivotally secured to a clamp 16 by pin 17. A length of piping 18 which is subject to vibration and thermal movement is tightly secured in clamp 16.

The suppressor unit is enlarged in FIGS. 2-7. As shown, piston-cylinder assembly 2 including a movable piston 19 and a cylindrical reservoir 3 are held in alignment by four tie rods 20 which extend through flanges 5, 6 and 8. More than four tie rods may be used depending upon the size of the unit. The ends of the tie rods are secured in the flange 8 and nuts 21 threaded to the opposite ends of rods 20 are used to draw the assembly together. Each flange 5 and 6 includes a short L-shaped passage 22 having an opening 23 into the piston-cylinder assembly to provide fluid communication to each side of the piston and an opening 24 in the face of the flange. The flange 6 also includes an L-shaped passage 25 which has an opening 26 into the reservoir 3 and an opening 27 into the bottom of the flange for communication with a cooperating passageway in the manifold (see FIG. 7). There are sight glass plugs 28 on opposite sides of the reservoir for visually determining the hydraulic fluid level therein. A removable plug 29 which includes a breather cap 30 is mounted in passage 31 which communicates with the reservoir.

The manifold 4 comprises a flat rectangular block 32 having an upper face 33 and a lower face 34. The block 32 is secured to the flanges 5 and 6 by bolts 35 which extend through the block into the flanges (see FIG. 3).

Figure 6:
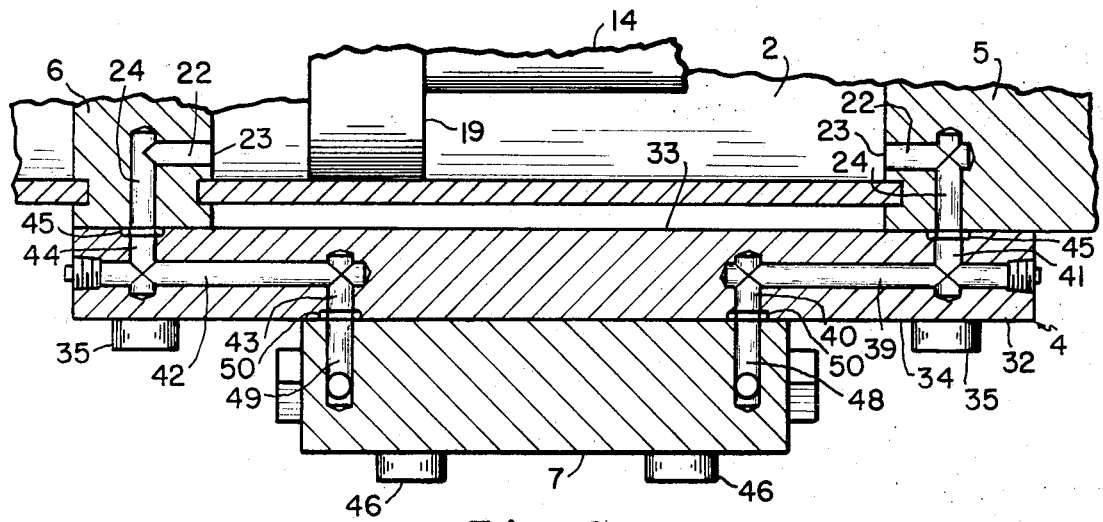
FIG. 6 is an enlarged sectional view along lines VI—VI of FIG. 3.
Figure 7:
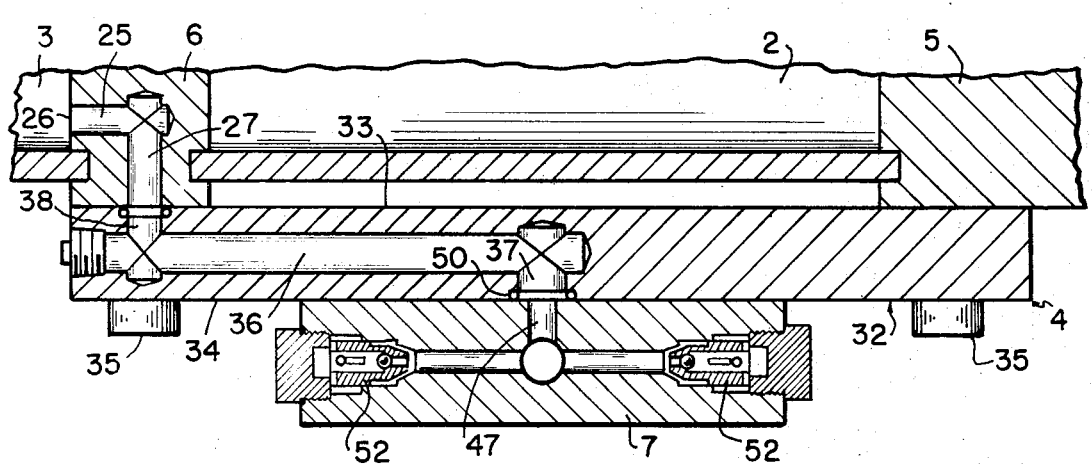
FIG. 7 is an enlarged sectional view along lines VII—VII of FIG. 3.

Referring to the sectional views of FIGS. 6 and 7, there are three passageways in the manifold block 32. Passageway 36 extends from near the center of the block 32, where it has an opening 37 into the face 34 of the block, to opening 38 in the face 33 which communicates with passage 25 in flange 6 which opens into the reservoir 3.

Passageway 39 (FIG. 6) extends from opening 40 in face 34 to opening 41 in face 33 and passageway 42 extends from opening 43 in face 34 to opening 44 in face 33. When the block is secured to flanges 5 and 6, openings 41 and 44 cooperate with openings 24 to permit hydraulic fluid to pass into and out of the piston-cylinder assembly through the block. Conventional O-ring seals 45 are placed between these openings to prevent leakage between the manifold and the piston-cylinder assembly.

Valve assembly 7 is secured to the face 34 of manifold block 32 by bolts 46 which extend through the valve assembly. The valve assembly has openings 47, 48 and 49 which communicate with openings 37, 40 and 43 respectively, in the manifold. Conventional O-ring seals 50 are also placed between these openings to prevent hydraulic fluid leakage at that point.

We prefer a particular valve assembly manufactured by Racine Hydraulics, Inc. of Racine, Wisconsin. It is a relatively streamlined block type valve assembly of low profile.

Figure 8:
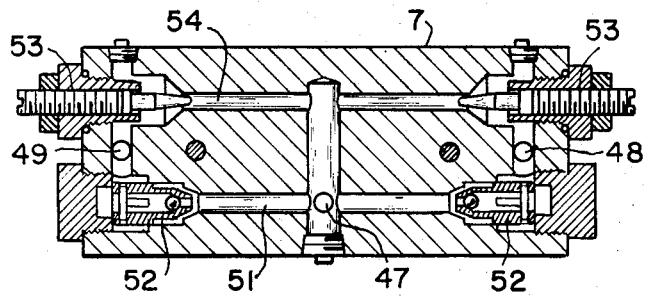
FIG. 8 is an enlarged sectional view along lines VIII—VIII of FIG. 2.

The valve assembly 7 comprises a unit, as shown in FIG. 8, having two fluid conduits, both of which are in communication with reservoir 3. In the first or main fluid conduit 51 there is a spring-biased double-acting valve 52 between each side of the piston and the reservoir. There are two needle valves 53 in the second or bypass fluid conduit 54 by which the fluid flow may be adjusted.

Figure 9:
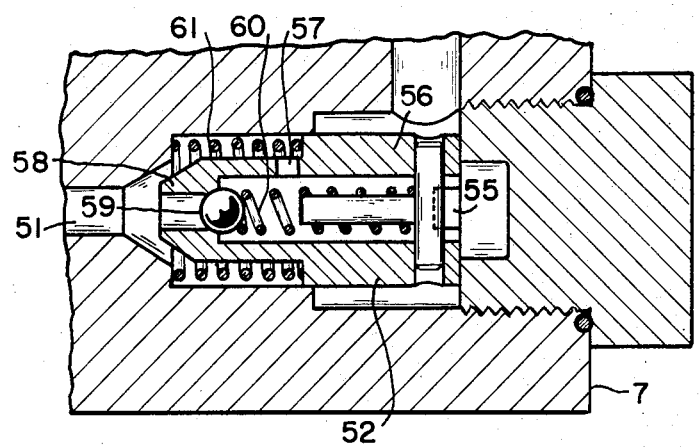
FIG. 9 is a detail of a double-acting valve of the valve assembly.

Each double-acting valve 52 comprises a thermal valve and a ball check valve (see FIG. 9). In normal operation in one direction fluid flows into the thermal valve from one end opening 55, passes within the valve body 56 to a small orifice 57 in the side of the body, then passes around the body and out into the main conduit. The fluid will not pass within nose 58 of the valve body due to the presence in the body of ball check 59 which is seated within the body and biased by spring 60. When pressure is applied to the fluid by the piston from the opposite direction spring 60 is overcome by the fluid removing the ball from its seat and permitting fluid to pass through the valve body and to the passage to the other side of the piston. At the same time, fluid can pass around the valve body 56 and through the orifice 57 within the valve body to the passageway to the same side of the piston and also through the bypass conduit 54.

However, when shock is experienced by the suppressor, for example, due to excessive thermal movement of the piping to which it is attached, the double-acting valve 52 is activated by fluid pressure in the main conduit 51 to close it, resulting in substantial resistance to movement of the piston in the piston-cylinder assembly. As previously described, normally the ball check is seated firmly within the nose of the valve permitting fluid flow only through the valve orifice 57. Due to shock, fluid buildup within the valve body overcomes spring 61 by which the body is biased resulting in the nose of the valve body seating in the passage 51 thus preventing any further fluid flow through the valve. The needle valves 53 permit a small volume of fluid to pass in the bypass conduit. But for the fluid bypass, pressure buildup in the valve assembly might destroy the valve assembly if additional shock were experienced in the same direction after the double-acting valves were closed upon an initial shock. By adjusting the needle valves 53, it is possible to change the permissible thermal movement which the suppressor unit will withstand before the suppressor becomes substantially rigid to resist further thermal movement.

Figure 10:
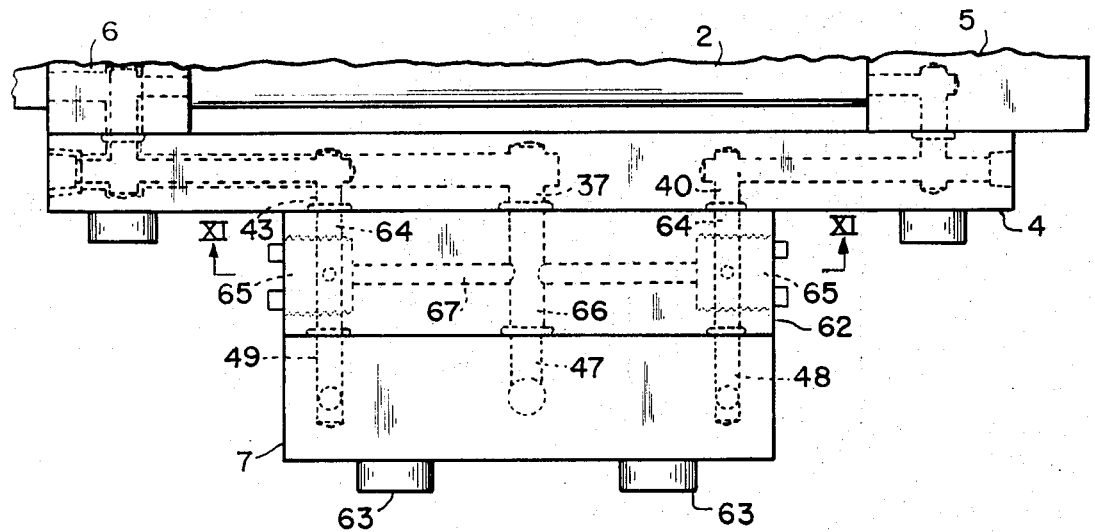
FIG. 10 is an elevation view showing a modification of the invention.
Figure 11:
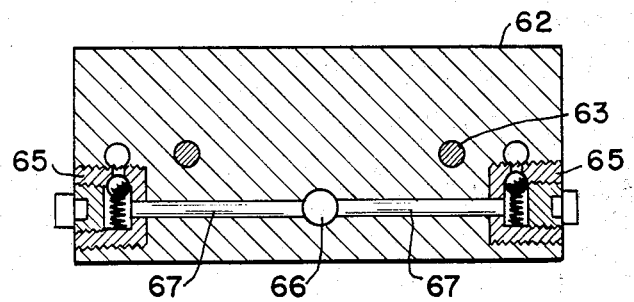
FIG. 11 is a sectional view along lines IX—IX of FIG. 10.

In the modification shown in FIGS. 10 and 11, a relief valve block 62 is disposed between the manifold 4 and the valve assembly 7 and is secured in place by bolts, such as bolts 63 of sufficient length, which extend between the valve block and the manifold. Two straight parallel passages 64 extend through block 62. Adjacent and in communication with each passage is a relief valve 65. There is a straight passage 66 through the block for communication with the reservoir. When the valve block is mounted between the manifold 4 and the valve assembly 7, the passages 64 are aligned for communication with openings 40 and 43 and passage 66 is aligned with opening 37 of the manifold for fluid communication. In this case, the openings 47, 48 and 49 communicate with passages 64 and 66 of the valve block. The relief valves are normally closed. If extreme shock is experienced by the piping, and consequently the piston in the piston-cylinder assembly 2 causing a surge of high pressure hydraulic fluid to flow through a passage 64, the valves 65 will open automatically to permit fluid to flow through bypass 67 and into passage 66 to the reservoir. By releasing the high pressure, damage to the sensitive valve assembly and to the piston-cylinder assembly is prevented. Such relief valves are well known in the art.

While we have described certain embodiments of our invention, it may otherwise be embodied within the scope of the appended claims.

We claim:

1. In an hydraulic shock and sway suppressor for controlling the motion of piping and the like which includes a piston-cylinder assembly, a reservoir, and a valve assembly for controlling the flow of hydraulic fluid, the improvement comprising:
   A. a cylindrical reservoir having means for venting hydraulic fluid to air pressure in axial alignment with the piston-cylinder assembly and
   B. a manifold mounted on and extending the length of the piston-cylinder assembly from one end to the other, said manifold mounting the valve assembly thereon and having a plurality of passageways providing fluid communication between the reservoir and the valve assembly and between the valve assembly and the piston-cylinder assembly, 2. The improvement of claim 1 in which the reservoir is mounted in axial alignment by tie rods extending from an end of the piston-cylinder assembly into a flange on an end of the reservoir.

3. The improvement of claim 1 wherein the valve assembly includes, in fluid connection with the passageways of the manifold:
   A. a main fluid conduit, a bypass fluid conduit, and a fluid conduit connecting them to the reservoir,
   B. a double-acting valve in the main conduit on each side of the piston, and
   C. a needle valve in the bypass conduit on each side of the piston, whereby fluid flow through the valve assembly from one side of the piston to the other side of the piston or to the reservoir is permitted, unless the fluid pressure through the double-acting valve exceeds a preestablished maximum value.

4. The improvement of claim 1 in which the manifold has three passageways, the first passageway providing fluid communication between the reservoir and the valve assembly, the second passageway providing fluid communication between one side of the piston and the valve assembly and a third passageway providing fluid communication between the other side of the piston and the valve assembly.

5. The improvement of claim 4 and including a valve block disposed between the manifold and the valve assembly, said valve block having:
   A. three passages: one extending from a passageway of the manifold which is in fluid communication with one side of the piston, a second extending from a passageway of the manifold which is in communication with the other side of the piston, and a third extending from the passageway of the manifold which is in fluid communication with the reservoir; and
   B. a bypass conduit within the valve block connecting the three passages; and a relief valve in each of said two first mentioned passages which is adapted to open when the pressure in the valve assembly or in the piston-cylinder assembly exceeds a preestablished level permitting hydraulic fluid to flow into the reservoir through the bypass conduit in the valve block to relieve the pressure within the suppressor.

6. An hydraulic shock and sway suppressor for controlling the motion of piping and the like comprising:
   A. a cylindrical piston-cylinder assembly having a piston;
   B. a cylindrical reservoir in axial alignment with the piston-cylinder assembly;
   C. a valve assembly for controlling the flow of hydraulic fluid between the piston-cylinder assembly and the reservoir; and
   D. a manifold mounted on and extending the length of the piston-cylinder assembly from one end to the other, said manifold mounting the valve assembly thereon and having a plurality of passageways providing fluid communication between the reservoir and the valve assembly and between the valve assembly and the piston-cylinder assembly.

7. A suppressor as set forth in claim 6 and wherein
   A. the valve assembly includes a main and a bypass conduit, each conduit being in communication with each side of the piston and the reservoir;
   B. two double-acting valves in the main conduit and two needle valves in the bypass conduit, one on each side of the piston;
   C. each double-acting valve comprising:
      (1) a valve body having a central opening and an orifice providing communication from a part of the main conduit on one side of the piston to another part of the main conduit on the same side of the piston, said valve body being biased to normally permit fluid flow in one direction through the valve, and
      (2) a ball check in the valve body and spring biased to close the central opening at one end to prevent fluid flow through the opening in said one direction such that normal fluid pressure in one direction will permit fluid flow through the orifice but excessive fluid flow will move the valve body into the conduit to close it, and normal fluid flow in the opposite direction will overcome the bias of the ball check to permit fluid flow through the valve body to the main conduit to the passageway on the same side of the piston.

8. An hydraulic shock and sway suppressor as set forth in claim 6 wherein a valve block is disposed between and permits fluid communication between the valve assembly and the manifold, said valve block comprising:
   A. a plurality of parallel passages for communication with the passages in each of the valve assembly and the manifold and having a bypass conduit within the valve block for fluid communication between the passages in the valve block; and
   B. relief valve means in the bypass conduit in the valve block which are normally closed to prevent flow through the bypass conduit but which, in response to excess pressure, will open to permit fluid flow through the bypass conduit to protect the valve assembly against excess pressure.

* * * * *